(12) United States Patent
Peng

(10) Patent No.: US 6,864,195 B2
(45) Date of Patent: Mar. 8, 2005

(54) HEAT WELDABLE ROOFING MEMBRANE

(75) Inventor: Lichih R. Peng, Fishers, IN (US)

(73) Assignee: BFS Diversified PRoducts, LLC, Indianapolis, IN (US)

( * ) Notice: Subject to any disclaimer, the term of this patent is extended or adjusted under 35 U.S.C. 154(b) by 191 days.

(21) Appl. No.: 10/219,534

(22) Filed: Aug. 15, 2002

(65) Prior Publication Data

US 2004/0033741 A1 Feb. 19, 2004

(51) Int. Cl.[7] .............................................. B32B 27/32
(52) U.S. Cl. ............................... 442/41; 442/2; 442/38; 442/43; 442/45; 442/46; 442/49
(58) Field of Search .............................. 442/2, 38, 41, 442/43, 45, 46, 49

(56) References Cited

U.S. PATENT DOCUMENTS

| | | |
|---|---|---|
| 4,130,535 A | 12/1978 | Coran et al. |
| 4,454,303 A | 6/1984 | Yoshimura et al. |
| 4,555,546 A | 11/1985 | Patel |
| 4,591,615 A | 5/1986 | Aldred et al. |
| 4,803,244 A | 2/1989 | Umpleby |
| 4,933,389 A | 6/1990 | Hikasa et al. |
| 4,978,716 A | 12/1990 | Flynn et al. |
| 4,990,566 A | 2/1991 | Hert |
| 5,051,478 A | 9/1991 | Puydak et al. |
| 5,104,940 A | 4/1992 | Hert et al. |
| 5,229,197 A | 7/1993 | Peterson |
| 5,250,612 A | 10/1993 | Hazlitt et al. |
| 5,266,392 A | 11/1993 | Land et al. |
| 5,387,648 A | 2/1995 | Ainsworth |
| 5,486,249 A | 1/1996 | Valaitis et al. |
| 5,525,679 A | 6/1996 | Effler, Jr. et al. |
| 5,565,521 A | 10/1996 | Effler, Jr. et al. |
| 5,591,798 A | 1/1997 | Patel |
| 5,668,220 A | 9/1997 | Effler, Jr. et al. |
| 5,677,383 A | 10/1997 | Chum et al. |
| 5,733,980 A | 3/1998 | Cozewith et al. |
| 5,747,592 A | 5/1998 | Huff et al. |
| 5,777,020 A | 7/1998 | Nagai et al. |
| 5,783,631 A | 7/1998 | Venkataswamy |
| 5,840,109 A | 11/1998 | Braga et al. |
| 5,847,053 A | 12/1998 | Chum et al. |
| 5,852,152 A | 12/1998 | Walton et al. |
| 5,874,139 A | 2/1999 | Bosiers et al. |
| 5,902,684 A | 5/1999 | Bullard et al. |
| 5,939,464 A | 8/1999 | Wang |
| 6,005,053 A | 12/1999 | Parkh et al. |
| 6,028,137 A | 2/2000 | Mahmud et al. |
| 6,048,909 A | 4/2000 | Chaudhary et al. |
| 6,055,786 A | 5/2000 | Hubbard et al. |
| 6,063,462 A | 5/2000 | Tsukamoto et al. |
| 6,094,889 A | 8/2000 | Van Loon et al. |
| 6,114,486 A | 9/2000 | Rowland et al. |
| 6,143,829 A | 11/2000 | Babb et al. |
| 6,169,145 B1 | 1/2001 | Medsker et al. |
| 6,184,290 B1 | 2/2001 | Ahmed et al. |
| 6,184,291 B1 | 2/2001 | Ahmed et al. |

(List continued on next page.)

FOREIGN PATENT DOCUMENTS

WO    WO 97/06209    2/1997

*Primary Examiner*—Ula Ruddock
(74) *Attorney, Agent, or Firm*—Scott A. McCollister

(57) ABSTRACT

A roofing membrane includes a substrate sheet formed of a thermoplastic vulcanizate (TPV) and a film layer of thermoplastic polyolefin (TPO) adhered to at least one surface of the substrate sheet. The TPV preferably includes a copolymer of ethylene and a carbonyl containing monomer dynamically vulcanized in a polyolefin thermoplastic, preferably metallocene-catalyzed polyethylene. A scrim reinforcement layer is optionally embedded in the TPV layer. When installed on a roof substrate, the membrane can be sealed by heat welding the seams of the membrane sheets.

22 Claims, 2 Drawing Sheets

U.S. PATENT DOCUMENTS

| | | |
|---|---|---|
| 6,207,754 B1 | 3/2001 | Yu |
| 6,217,982 B1 | 4/2001 | Dawson |
| 6,225,412 B1 | 5/2001 | Chaffin et al. |
| 6,231,975 B1 | 5/2001 | Kong et al. |
| 6,238,502 B1 | 5/2001 | Hubbard |
| 6,253,528 B1 | 7/2001 | Hubbard et al. |
| 6,255,389 B1 | 7/2001 | Ouhadi et al. |
| 6,270,891 B1 | 8/2001 | Maugans et al. |
| 6,277,916 B1 | 8/2001 | Terbrueggen et al. |
| 6,281,289 B1 | 8/2001 | Maugans et al. |
| 6,284,820 B1 | 9/2001 | Braga et al. |
| 6,288,171 B2 | 9/2001 | Finerman et al. |
| 6,308,482 B1 | 10/2001 | Strait |
| 6,313,183 B1 | 11/2001 | Pillai et al. |
| 6,316,549 B1 | 11/2001 | Chum et al. |
| 6,348,272 B1 | 2/2002 | Haveaux et al. |
| 2001/0003625 A1 | 6/2001 | Apgar et al. |
| 2002/0173575 A1 * | 11/2002 | Artz et al. .................. 524/451 |
| 2004/0067380 A1 * | 4/2004 | Maeda et al. ............... 428/500 |

* cited by examiner

HEAT WELDABLE ROOFING MEMBRANE

FIELD OF INVENTION

The present invention relates to a multicomponent membrane comprising at least two polymeric layers. More particularly, the present invention relates to a multilayer membrane having a surface TPO layer adhered to a TPV support layer useful in the manufacture of construction and support membranes.

BACKGROUND OF THE INVENTION

Polymeric roof sheeting is used as single ply roofing membrane for covering industrial and commercial flat roofs. Such membranes are generally applied to the roof surface in vulcanized or cured state.

Because of its outstanding weathering resistance and flexibility, cured EPDM based roof sheeting has rapidly gained acceptance. This material is often prepared by vulcanizing the composition in the presence of sulfur or sulfur containing compounds such as mercaptans or using radiation curing. Notwithstanding the usefulness of radiation curing and sulfur curing, a disadvantage of utilizing these elastomers is the lack of adhesion of EPDM, especially cured EPDM, to itself. In addition to being highly labor intensive, this is a serious problem in that, in applying EPDM sheets to a roof, it is usually necessary to splice the cured EPDM sheets together along the seams. This splice or seam area is subjected to both short term and long term stresses such as those caused by roof movement, heavy winds, freeze-thaw cycling and thermal cycling. Such stresses may manifest themselves in shear forces that can result in seam peel back under severe stress conditions or a partially open seam under less severe conditions.

In view of the foregoing, it has been necessary to use an adhesive to bond the cured EPDM sheets together. These adhesives must not only provide sufficient strength to resist the short and long term stresses described above, they must also be resistant to oxidation, hydrolysis and chemical breakdown. Adhesives that meet these requirements are difficult to produce and can be time consuming to apply to the seams of EPDM sheets, thereby increasing the overall cost of installing the waterproof membrane.

Therefore, other materials for use in roofing membrane have been investigated. Within the last decade, thermoplastic polyolefin (TPO) sheeting has come into use in the manufacture of waterproof roofing membranes. TPO membrane provides good service life, excellent chemical resistance and has the advantage of being recyclable. In addition, TPO membrane can be sealed along its seams without the use of an adhesive by heating the edges of the sheets to a temperature above the melt temperature of the TPO and pressing the sheets together. This technique of joining sheets of roofing membrane, known as heat welding, provides a strong seal and results in overall time and cost savings in the application of the roofing membrane.

Nevertheless, TPO roofing membrane suffers from several distinct disadvantages. First, TPO roofing generally requires scrim reinforcement embedded within the sheets to improve the flame resistance and allow manipulation of the sheets under hot air welding. Scrim is a support structure typically comprising a mesh of interwoven strands of thermoplastic. Without such scrim, the TPO often becomes too "soupy" to laminate together. This scrim adds an additional cost to the TPO membrane.

Second, such membranes exhibit relatively weak bond strength with the roofing substrate. This, along with the typical ductile behavior of most TPOs prevents such membranes from supporting high wind uplift loads. Finally, present day TPO membranes are often too stiff and lacking in compliability (as indicated by the high secant modulus properties of TPO resins) due to the relatively high crystallinity of many TPOs to be easily bent to conform to the contours of a roof, and therefore are quite cumbersome to install due to this non-pliable property.

As disclosed in published U.S. Patent Application US2001/0003625A1 to Apgar et al., it is known to produce a heat weldable roofing membrane comprised of a layer of TPE or TPO on a vulcanized EPDM sheet. Such a membrane suffers from the fact that the processing temperature of TPO and TPE and the curing temperature of EPDM are too close, thus making it difficult to seal the seam. In addition, physically bonded thermoplastic and crosslinked rubber will reject each other in the long term, resulting in delamination and compromising the effectiveness of the membrane.

Therefore, a need exists for a heat-weldable roofing membrane that retains the advantages of TPO while being more pliable and easier to install, having a greater bond strength with the roof, and not requiring the use of a supporting scrim.

SUMMARY OF THE INVENTION

In a first aspect, the invention provides a heat weldable roofing membrane including a substrate layer formed of TPV and a film layer laminated to at least one side surface of the substrate layer and formed of TPO.

In a second aspect, the invention provides a heat weldable roofing membrane including a substrate layer comprising TPV, the TPV comprising metallocene-catalyzed polyethylene, a polypropylene polymer, a fire retardant, and an at least partially crosslinked copolymer of ethylene and a carbonyl containing monomer; and a film layer adhered to at least one surface of the substrate layer and comprising TPO.

In a third aspect, the invention provides a heat weldable roofing membrane including a substrate layer formed of TPV, wherein the TPV comprises a blend of metallocene-catalyzed polyethylene, a polypropylene polymer and an at least partially crosslinked copolymer of ethylene and a carbonyl containing monomer, and a film layer laminated to at least one side surface of the substrate layer and formed of TPO, wherein the membrane has a thickness of about 30 to about 50 mils.

BRIEF DESCRIPTION OF THE DRAWINGS

The present invention will be described in detail with several preferred embodiments and illustrated, merely by way of example and not with intent to limit the scope thereof, in the accompanying drawings.

DETAILED DESCRIPTION OF THE INVENTION

Figure 1:
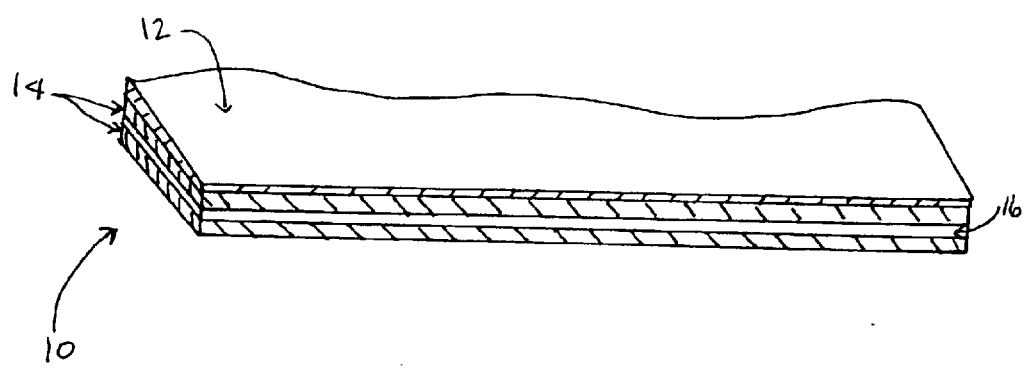
FIG. 1 is partial perspective view of a sheet of roofing membrane in accordance with a first embodiment of the invention.

With reference to FIG. 1, a roofing membrane 10 is shown in accordance with one embodiment of the present invention. The roofing membrane 10 includes a top or film layer 12 of thermoplastic polyolefin (TPO) and substrate layer 14 of thermoplastic vulcanizate (TPV) laminated to the TPO layer. A scrim reinforcement layer 16 may optionally be provided in the TPV layer 14 for added support.

Figure 2:
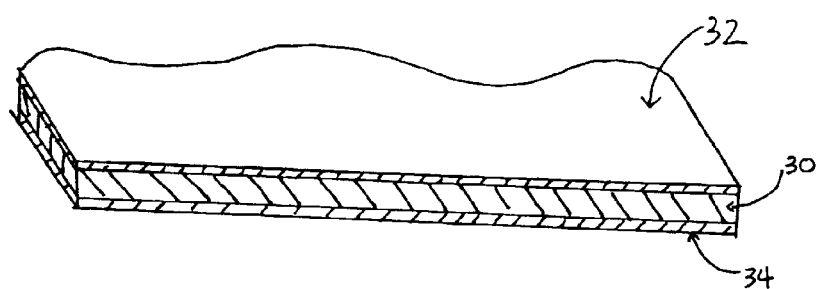
FIG. 2 is a partial perspective view of a sheet of roofing membrane in accordance with a second embodiment of the invention.

In a second embodiment of the present invention, as illustrated in FIG. 2, a roofing membrane 20 is shown in which a substrate layer of TPV 30 is positioned between top 32 and bottom 34 film layers of TPO. No scrim is necessary in this arrangement, although, of course, it may be included if desired.

The TPO layer used in the various embodiments of the present invention may be any commercialized TPO conventionally used in roofing membrane applications. TPOs are a class of uncrosslinked thermoplastic elastomers (TPEs) based predominantly or wholly on olefin polymers.

Thermoplastic elastomers (TPEs) are an important class of polymeric compositions that are particularly useful in producing durable components through conventional extrusion, calendaring or injection molding processes. Typically a TPE is a blend of thermoplastic polymer and an elastomer rubber. TPEs possess properties similar to a cured elastomer but TPEs have the advantage, compared to a rubber, that they undergo plastic flow above the melting point of the thermoplastic polymer component of the blend. This permits TPEs to be used in component fabrication through common polymer processing techniques, such as injection molding techniques to produce finished articles having resilient rubber-like properties without the need for a vulcanizing cure of the finished article. This provides TPEs with an advantage compared to conventional curable elastomers because conventional curable elastomers are tacky, do not undergo plastic flow at elevated temperatures and therefore cannot be fabricated into finished article forms by an extrusion or injection molding technique.

A typical TPO is a melt blend or reactor blend of a polyolefin plastic, typically a propylene polymer, with a non-crosslinked olefin copolymer elastomer (OCE), typically an ethylene-propylene rubber (EPM) or an ethylene-propylene-diene rubber (EPDM). In those TPOs made from EPDM, the diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. Conventional EPDM's utilized in TPOs for roofing membranes include various grades of VISTALON, available from the Exxon Chemical Co., and ROYALENE, available from Uniroyal Chemical Co.

The polyolefin plastic imparts to the TPO the temperature resistance and rigidity typical of that thermoplastic resin while the olefin copolymer elastomer imparts flexibility, resilience and toughness to the TPO. As stated, any conventional TPO used in the roofing membrane industry is suitable for use in the present invention. Preferred TPOs are those made by blending ethylene-propylene elastomers with polypropylene. The ethylene-propylene elastomers may be blended with the polypropylene by conventional mixing techniques. An example of a suitable group of TPOs for use in the present invention are medium flow TPOs manufactured under the trade name ADFLEX, available from Basell.

Various fillers and processing materials as well as other components may be added to the TPO used in the present invention. Suitable fillers may include reinforcing and non-reinforcing materials such as those customarily added to roofing membranes. Non-limiting examples of such fillers include carbon black, calcium carbonate, clay, silica, and the like. With respect to processing materials, various processing oils, waxes and the like intended to improve the processing of the material may be included in any concentration that does not significantly detract from the properties of the TPO.

The polymer may also be formulated with stabilizers, pigments and antioxidants to obtain the appropriate weathering properties. In addition, flame retardant fillers such as aluminum trihydrate (ATH), magnesium trioxide, calcium carbonate, mica, talc, or glass may be added. Filler levels can range from 0 to about 80% by weight.

The TPO can be processed using conventional plastics techniques, such as calendaring or extrusion to form a thin sheet or film for use as the top layer of membrane of the present invention.

As indicated in the description of the two embodiments above, laminated to the TPO layer(s) is a TPV layer. Thermoplastic vulcanizates (TPV's) are polyolefinic matrices, preferably crystalline, through which thermoset elastomers are generally uniformly distributed. Examples of thermoplastic vulcanizates include EPM and EPDM thermoset materials distributed in a crystalline polypropylene matrix. One example of a commercial TPV is SANTOPRENE thermoplastic rubber, which is manufactured by Advanced Elastomer Systems and is a mixture of crosslinked EPDM particles in a crystalline polypropylene matrix. These materials have found utility in many applications which previously used vulcanized rubber, e.g. hose, gaskets, and the like. TPV's are noted for their processability as thermoplastics while retaining the excellent resilience and compression set properties of vulcanized rubbers.

Commercial TPV's are typically based on vulcanized rubbers in which a phenolic resin, sulfur or peroxide cure system is used to vulcanize, that is crosslink, a diene (or more generally, a polyene) copolymer rubber by way of dynamic vulcanization, which is a process in which the rubber is crosslinked while mixing (typically vigorously), in a thermoplastic matrix. Sulfur or a phenolic resin is typically preferred over peroxide free radical cure systems because peroxide may degrade and/or crosslink the polypropylene or polyethylene thermoplastic as well as the rubber and this is in turn limits the extent of rubber crosslinking that can occur before the entire mixture degrades or crosslinks and is no longer thermoplastic.

A preferred method of preparing a thermoplastic vulcanizate known by those skilled in the art is to form an admixture of non-crosslinked elastomeric polymer and polyolefin resin and curing agent. The admixture is then masticated at a vulcanization temperature. Preferably the non-crosslinked polymer, polyolefin are intimately mixed before a curing agent is added. When prepared in a conventional mixing apparatus such as a multiple-roll mill, Banbury or Brabender mixer or mixing extruder, this is known as a "two-pass" cycle. Additional additives may added, including, but not limited to those fillers, fire retardants, stabilizers, pigments and antioxidants described above with respect to the TPO layer.

Any conventional TPV having the desired weatherability, flexibility and strength may be used in the present invention. Examples of suitable TPVs for use in the present invention include those prepared by blending an olefinic thermoplastic and either an ethylene copolymer or terpolymer, such as disclosed in U.S. Pat. No. 4,990,566 to Hert, or a nitrile rubber, such as disclosed in U.S. Pat. No. 4,591,615 to Aldred et al, the disclosure of both of which are incorporated herein by reference.

A preferred TPV for use in the present invention includes a copolymer of ethylene and a carbonyl containing monomer such as vinyl acetate, acrylic acid, (alk)acrylic acid, methacrylate and unsaturated polycarboxylic acid. A particularly preferred TPV for use in the present invention is a dynamically cured blend of metallocene polyethylene (m-PE), an ethylene/vinyl acetate or ethylene/methacrylate copolymer, and optionally, a polypropylene polymer. As used herein, polypropylene polymer is meant to include both homopolymers as well as copolymers of polypropylene and another olefinic polymer. A preferred propylene polymer for use in the present invention is ethylene-propylene random copolymer. A peroxide is preferably used as the curing agent. The metallocene polyethylene may be a homopolymer or a copolymer of ethylene and a small amount of olefinic monomer. The TPV will preferably contain between about 20 and about 80 weight percent m-PE, 5 to 50 weight percent fire retardant, and 1 to about 30 weight percent ethylene copolymer. A suitable ethylene copolymer is an ethylene/vinyl acetate copolymer marketed under the name EVANTANE, available from AtoFina. Formulations of two alternate particularly preferred TPVs for use in the present invention are set forth below in Table 1 and are labeled as "white" and "black." All formulation amounts are in parts by weight.

TABLE 1

TPV Formulation

| Chemical Name | Trade Name | Supplier | White | Black |
|---|---|---|---|---|
| m-PE | Engage 8452 | DuPont Dow | 61 | 57 |
| PP random copolymer | Fina PP 7622Mz | AtoFina | 18 | 18 |
| Ethylene/vinyl acetate copolymer | Evatane 28-05 | AtoFina | 21 | 15 |
| bis (t-butlyperoxy)-diisopropylbenzene | Vulcup 40 Si | Hercules | 0.65 | 0.65 |
| m-phenylene bis-maleimide | HVA-2 | DuPont Dow | 0.33 | 0.33 |
| dicotyl sebacate | PlastHall DOS | C. P. Hall | 4 | — |
| paraffinic oil | SunPar 2280 | Sunoco | — | 6 |
| ethylene wax | Epolene N-20 P | Eastman | 1 | 1 |
| ethylene-bis-tetrabromophthalimide | Saytex BT-93W | Albermarle | 20 | 10 |
| Antimony Trioxide | Fireshield H | Laurel Ind. | 10 | 5 |
| magnesium hydroxide | NH-121S | BassTech Int. | 15 | 10 |
| zinc borate hydrate | Firebrake ZB | Borax | 3.5 | 2.5 |
| carbon black concentrate | CM 92385 (50% LDPE) | Ampacet | — | 20 |
| titanium dioxide | Kronos 2160 | Kronos | 9 | — |
| talc | Microtuff AG609 | Specialty Minerals | 6 | 6 |
| Antioxidant | Irgstab FS301FF | Ciba | 0.2 | 0.1 |
| UV resistor | EB 40-70 | Ciba | 0.25 | — |
| | | TOTAL | 169.93 | 151.58 |

The various ingredients may be mixed and dynamically cured using standard techniques known in the industry. For example, the compounding ingredients can be admixed, utilizing an internal mixer (such as a Banbury or Brabender mixer), an extruder, and/or a two-roll mill, or other mixers suitable for forming a viscous relatively uniform admixture. One advantage of the above two formulations is that they may be prepared using a "one-pass" method. That is, all of the components, including the curing agent, are mixed at the same time. This saves time and resources in the preparation of the TPV material as compared to typical two-pass procedures that are often necessary for the production of TPVs.

The resulting admixture is sheeted to a thickness ranging from 5 to 200 mils, preferably from 30 to 60 mils, by conventional sheeting methods, for example, milling, calendaring or extrusion. The sheeting can be cut to desired length and width dimensions at this time.

An exemplary process for producing the TPV is to mix all the ingredients, except the curing agent and antioxidant in a Brabender mixer set to 120° C. with a mixing speed of 70 rpm. After fluxing the mixture, the curing agent is added and the mixer temperature is then ramped up to 180° C. at a rate of 25° C./minute and the rotor speed is lowered to 35 rpm. After the torque rises to a steady state, the mixer is turned off and the composition is transferred to a twin-roll mill. The antioxidant is added while milling the mixture at about 70° C.

It has been discovered that the TPV made according to the above process using m-PE is much more stable in outdoor applications than those using polypropylene as the base resin as disclosed in the Hert patent above. Metallocene PE is also more compatible with an ethylene/vinyl acetate copolymer than polypropylene, thereby allowing the rubber particles to distribute more evenly during curing and providing improved mechanical strength, long term weathering and flame resistance. This TPV is also superior in roofing membrane applications to the nitrile rubber board TPV disclosed in the Aldred patent, since nitrile rubber is not heat weldable and exhibits poor weatherability.

As noted, a scrim reinforcement layer 16 may be used, particularly in the first embodiment of the present invention as illustrated in FIG. 1. Suitable scrim reinforcement layer 16 comprises a mesh of interwoven strands of thermoplastic or metal having a tensile strength sufficient to resist tearing when exposed to typical tensile loads experienced by roofing membranes from various directions. A preferred scrim reinforcement layer 16 is one comprised of polypropylene or polyethylene terephthalate (PET). In the embodiment of the invention illustrated in FIG. 2, comprising a TPV layer sandwiched between a top and bottom TPO layer, the TPV layer may be reinforced with short chopped polymeric or natural fibers, such as polyester, embedded in said TPV layer. Such fibers impart additional reinforcement to the membrane, and provide it with mechanical properties comparable to conventional scrim reinforced TPO membranes. Such fibers can be manufactured from recycled scrim, maintaining the total recyclable nature of the present membrane.

The thin film of TPO is adhered to the layer of TPV. This can be accomplished using conventional techniques known in the industry. For example, the thin film of TPO may be continuously extruded onto a sheet of the TPV as the TPV exits the milling process. Alternately, the TPO may be melt-bonded to the TPV under elevated temperature and pressure or laminated using a lamination roll. Whichever process is employed to bond the film of TPO to the TPV, it has been found that to obtain an acceptable bond, the surface of the TPV must be clean and free of release agent.

During installation on a roof, sheets of the roofing membrane of the present invention may be bonded to each other without the use of adhesives using heat welding. Such techniques are well-known in the industry. Generally, sheets of the roofing membrane are laid on the roof such that each sheet overlaps an adjacent sheet. Next, heat and pressure are applied to the overlapping edges of the two roofing membrane sheets to form a seam. The amount of overlap and the corresponding width of the seam can vary depending on the requirements of the application. At the location of the seam, heat is applied to the membrane to raise its temperature above the melt temperature of the TPO layer(s). The TPO layer(s) will flow along the seam, forming a weatherproof seal.

As indicated, the TPO can be processed using conventional plastics techniques, such as injection molding, calendaring and extrusion to form a thin sheet or film. The thin film of TPO is laminated to a sheet of TPV. The thin film 12 of TPO may be continuously extruded onto the sheet of TPV as the TPV exits the extrusion process or the TPO may be bonded to the TPV under elevated temperature and pressure. Generally, the thickness of the TPO film can range between from about 2–20 mils although greater or less thicknesses may be employed and thus, are not precluded. The total thickness of the TPO coated TPV membrane is typically from about 42 to about 66 gauge, preferably at least 42 gauge (0.040 inches) which is the minimum thickness specified in standards set by the Roofing Council of the Rubber Manufacturers Association for non-reinforced rubber sheets for use in roofing applications. In many cases, the admixture is sheeted to 42–45 gauge thickness since this is the standard thickness for a large percentage of "single-ply" roofing membranes used commercially.

As described above, one embodiment of a roofing membrane according to the present invention 10, as depicted in FIG. 1, comprises a TPO top layer or film 12 adhered to a TPV bottom layer 14 and preferably including a scrim reinforcement 16. While the TPO layer 12 provides the advantages of heat weldability, strong mechanical performance and excellent chemical resistance, the TPV layer 14 makes the membrane more pliable, allowing for easier handling and installation of the membrane. In addition, since the TPV has a high amorphous phase, the bond strength of the resulting membrane to the roofing substrate will be greater than a typical TPO membrane. Thus, in fully adhered roofing applications, the fleece layer commonly applied to the bottom of a roofing membrane to assist in bonding with the roof substrate is unnecessary.

In a second embodiment, illustrated in FIG. 2, a thin top and bottom layer of TPO 32, 34 is coextruded on both sides of a TPV layer 30. No reinforcing scrim is necessary, although it may be included. The TPO 32, 34 can be highly crystalline and can also be highly loaded with fire retardant materials without significantly reducing the overall pliability and recoverability of the membrane, since these properties are primarily supplied to the membrane by the core TPV layer. The bottom layer 34 of TPO contributes to producing a secure seam during the heat welding of the membrane. The roofing membranes 10, 20 produced according to the above two embodiments advantageously cost less to produce than a pure TPV membrane and are 100% recyclable.

A sample membrane made in accordance with the teachings of the present invention comprising ADFLEX TPO laminated onto a scrim reinforced TPV compound made in accordance with the formulation set out in Table 1 was produced. The physical properties of this membrane as well as its bond strength with the TPV layer bonded to a substrate were compared with those of a conventional TPO membrane known by those skilled in the art having the same grade of ADFLEX on both sides of a standard polypropylene scrim. The results are listed in table 2.

TABLE 2

Properties of Scrim Supported TPO/TPV Laminate v. Conventional TPO Membrane

| Property | TPO/TPV Membrane | TPO/Scrim Membrane |
|---|---|---|
| Thickness (mil) | 46 | 50 |
| Break Strength Tb (MD) at room temperature (lbf) | 335 | 350 |
| Elongation at Break Eb (MD) at room temperature (% elongation) | 31 | 28 |
| Tongue Tear (MD), (lbf) | 141 | 92 |
| Tensile Strength (psi) | 1300 | 2600 |
| Tongue Tear (CD), (lbf) | 132 | 90 |
| Puncture FTM 101oC, (peak inMD) | 347 | 300 |
| Bond Strength to plywood (lb/in) | 10 | 4.5 |
| Bond Strength to aluminum (lb/in) | 6 | 3 |

As can be seen in Table 2, the break strength of both membranes are approximately equivalent, even though the tensile strength of the inventive TPO/TPV membrane is much lower than the TPO/Scrim membrane. The tongue tear, puncture resistance and bond strength (regardless of substrate) are also superior for the TPO/TPV membrane, thus giving overall improved membrane performance.

The invention has been described with reference to the preferred embodiments. Obviously, modifications and alterations will occur to others upon a reading and understanding of this specification. The invention is intended to include all such modifications and alterations in so far as they come within the scope of the appended claims and the equivalents thereof.

What is claimed is:

1. A heat weldable roofing membrane comprising:
   a substrate layer comprising a thermoplastic vulcanizate (TPV); and
   a film layer adhered to at least one surface of said substrate layer, said film layer comprising a thermoplastic olefin (TPO).

2. The roofing membrane of claim 1, wherein said TPV comprises polyethylene thermoplastic blended with an at least partially crosslinked ethylene copolymer rubber.

3. The roofing membrane of claim 2, wherein said polyethylene thermoplastic is a metallocene catalyzed polyethylene.

4. The roofing membrane of claim 2, wherein said ethylene copolymer rubber is a copolymer of ethylene and a carbonyl containing monomer.

5. The roofing membrane of claim 4, wherein said ethylene copolymer rubber is an ethylene/vinyl acetate copolymer.

6. The roofing membrane of claim 2, wherein said TPV further comprises a polypropylene polymer.

7. The roofing membrane of claim 6, wherein said polypropylene polymer comprises an ethylene-propylene random copolymer.

8. The roofing membrane of claim 1, wherein said TPO comprises polypropylene blended with an uncrosslinked olefinic elastomer.

9. The roofing membrane of claim 1, wherein said substrate layer further comprises a scrim reinforcing layer embedded in said substrate layer.

10. The roofing membrane of claim 9, wherein said scrim reinforcing layer comprises polypropylene.

11. The roofing membrane of claim 1, wherein said film layer has a thickness of from about 2 mils to about 20 mils.

12. The roofing membrane of claim 1, wherein said total thickness of said membrane is about 30 to about 50 mils.

13. The roofing membrane of claim 1, wherein said film layer is adhered to both surfaces of said substrate layer.

14. The roofing membrane of claim 1, wherein said film layer is adhered to at least one surface of said substrate layer by extrusion or melt bonding of said TPO onto said substrate layer.

15. The roofing membrane of claim 1, wherein said TPV further comprises at least one of the following: a UV stabilizer, a filler, a flame retardant, a processing oil, a pigment and an antioxidant.

16. The roofing membrane of claim 1, further comprising chopped polyester fibers embedded in said membrane.

17. A heat weldable roofing membrane comprising:
   a substrate layer comprising TPV, said TPV comprising metallocene-catalyzed polyethylene, a polyethylene polymer and an at least partially crosslinked copolymer of ethylene and a carbonyl containing monomer; and
   a film layer adhered to at least one surface of said substrate layer and comprising TPO.

18. The roofing membrane of claim 17, wherein said at least partially crosslinked copolymer of ethylene and carbonyl containing monomer is an ethylene/vinyl acetate copolymer.

19. The roofing membrane of claim 17, wherein said film layer is adhered to both surfaces of said substrate layer.

20. A heat weldable roofing membrane comprising:
   a substrate layer comprising TPV, said TPV comprising from about 20 to 80 weight percent of metallocene-catalyzed polyethylene, a propylene polymer, about 5 to 50 weight percent fire retardant, and about 1 to 30 weight percent of an at least partially crosslinked copolymer of ethylene and a carbonyl containing monomer; and
   a film layer adhered to at least one surface of the substrate layer and comprising TPO, wherein said membrane has a thickness of about 30 to about 50 mils.

21. The roofing membrane of claim 20, wherein said propylene polymer comprises a random polypropylene copolymer.

22. The roofing membrane of claim 20, wherein said copolymer of ethylene and carbonyl containing monomer is an ethylene/vinyl acetate copolymer.

* * * * *